United States Patent

Baker

(10) Patent No.: US 6,358,485 B1
(45) Date of Patent: Mar. 19, 2002

(54) SEMICONDUCTOR PROCESSING EXHAUST ABATEMENT

(75) Inventor: Derek Martin Baker, Bristol (GB)

(73) Assignee: The BOC Group plc, Windlesham (GB)

(*) Notice: Subject to any disclaimer, the term of this patent is extended or adjusted under 35 U.S.C. 154(b) by 0 days.

(21) Appl. No.: 09/596,128

(22) Filed: Jun. 16, 2000

(30) Foreign Application Priority Data

Jun. 16, 1999 (DE) .............................................. 9913970

(51) Int. Cl.⁷ .............................................. C07C 11/24
(52) U.S. Cl. ................................. 423/245.1; 423/245.3
(58) Field of Search ........................... 423/245.1, 245.3, 423/245.2, 123, 34, 42, 49, 50, 326, 347; 422/122, 168, 173, 198, 900; 502/324, 344, 345; 588/205, 228, 229, 230

(56) References Cited

U.S. PATENT DOCUMENTS 5,009,872 A * 4/1991 Chuang et al. .......... 423/245.3
5,632,964 A * 5/1997 Ishii et al. ................... 423/210
5,853,678 A * 12/1998 Sugimori et al. ........... 423/210
6,099,649 A * 8/2000 Schmitt et al. ............. 118/715

FOREIGN PATENT DOCUMENTS

| EP | 0495392 | 7/1992 |
| JP | 60 125233 | 7/1985 |
| JP | 05 237334 | 9/1993 |

* cited by examiner

Primary Examiner—Steven P. Griffin
Assistant Examiner—Edward M. Johnson
(74) Attorney, Agent, or Firm—Salvatore P. Pace

(57) ABSTRACT

A process for the abatement of trimethylvinylsilane (TMVS) by contacting a gas stream containing TMVS with copper (II) oxide (CuO) and/or manganese oxide ($MnO_2$) in the presence of sufficient oxygen to prevent reduction of the oxides and at a temperature of at least room temperature, but preferably, at an elevated temperature greater than 100° C.

5 Claims, 1 Drawing Sheet

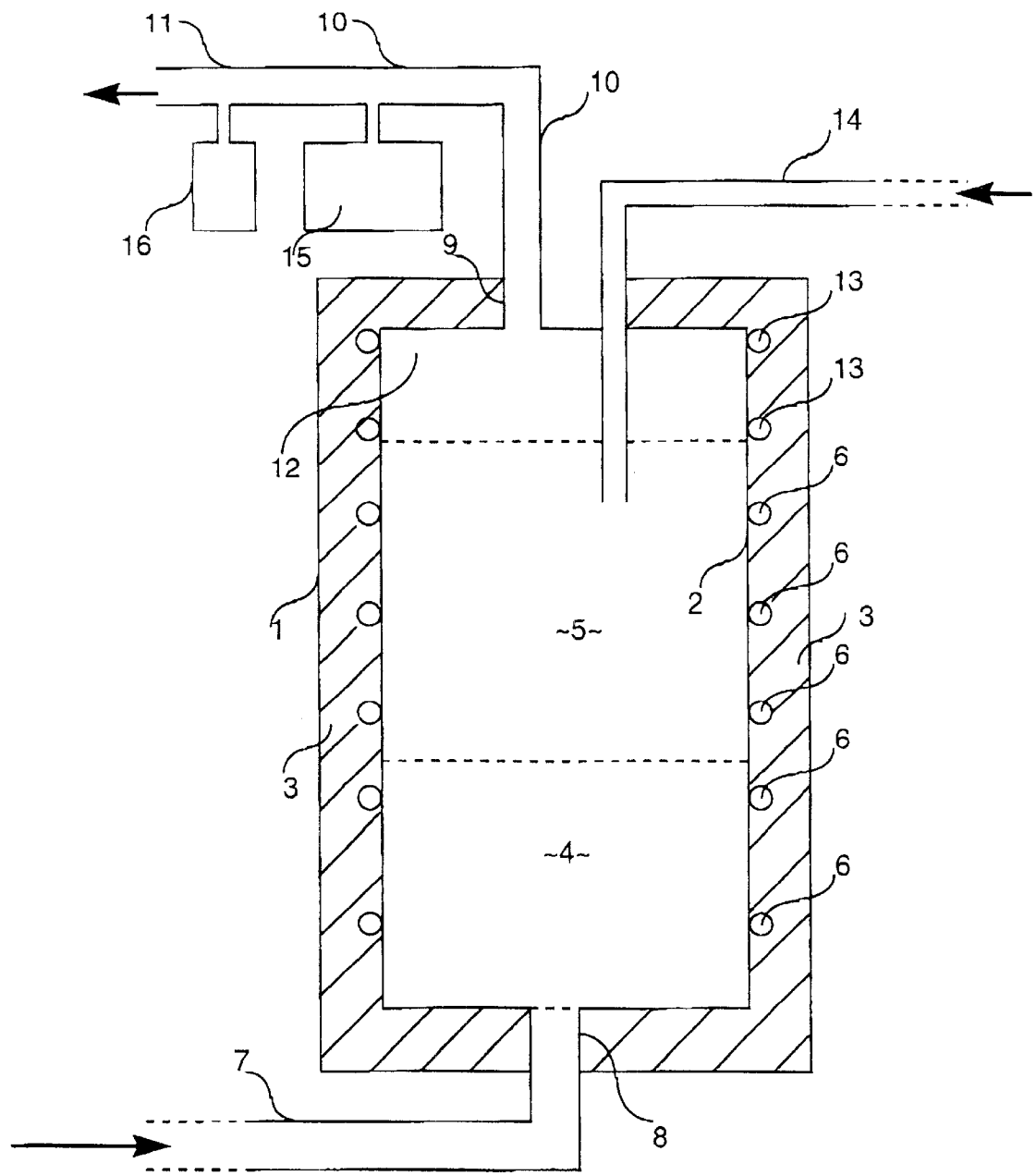

SEMICONDUCTOR PROCESSING EXHAUST ABATEMENT

BACKGROUND OF THE INVENTION

This invention relates to the removal of noxious substances from exhaust streams from semiconductor manufacturing processes. Many substances used in semiconductor device manufacturing, and which are extracted from a chamber in which such manufacturing takes place normally by means of a vacuum pump, are toxic or environmentally harmful and must therefore be removed or scrubbed from the exhaust gas stream to render it harmless before its release in to the atmosphere.

A number of different types of wet or dry chemical scrubbing reactors have been proposed and numerous are commercially employed in the semiconductor industry.

For example in U.S. Pat. Nos. 5,213,767 and 5,417,934, the contents of which are incorporated herein by reference there is disclosed a dry chemical reactor comprising a packed tube, for example 1.5 m in length, of granular substances heated to 500° C. and through which the exhaust stream is directed including in particular a first stage of silicon (with an optional addition of copper when the exhaust stream contains nitrogen trifluoride ($NF_3$)) and a second stage of calcium oxide commonly in the form of lime. Such a reactor sold as the GRC™ reactor by BOC Edwards has met with considerable commercial success for the scrubbing of such toxic substances.

A relatively new substance used in metal oxide chemical vapour deposition (MOCVD) semiconductor processing is 1,1,1,5,5,5-hexafluoropentane-2,4,dionato copper (1) trimethylvinylsilane sold under the trade name "Cupraselect". Use of this organo-metallic substance in MOCVD processing produces trimethylvinylsilane (TMVS) as a by-product which must be scrubbed from exhaust stream exhaust from the processing chamber.

It is known that a certain abatement of TMVS may be effected by thermal decomposition methods. Such methods include the use of the GRC reactor described above which generally would involve passing the TMVS vapour in an exhaust stream diluted in nitrogen gas through the heated silicon and calcium oxide granules. However, it has been found that such thermal decomposition methods can remove only eighty or ninety per cent of the TMVS in the exhaust stream.

In view of the strongest regulations regarding exhaust emissions adopted by governmental authorities and by the semiconductor companies themselves, however, threshold limiting values (TLVs) are set for the different exhaust gas species. Although no specific TLV has yet been set for TMVS, it will undoubtedly be much more onerous than the levels of abatement so far achieved with thermal decomposition methods, for example no more than 10 parts per million (ppm) TMVS emitted to the atmosphere.

There is, therefore, a need for a process in which TMVS is abated to a much greater extent than is currently available.

SUMMARY OF THE INVENTION

In accordance with the invention, there is provided a process for the abatement of trimethylvinylsilane (TMVS) by contacting a gas stream containing TMVS with copper (II) oxide (CuO) and/or manganese oxide ($MnO_2$) in the presence of sufficient oxygen to prevent reduction of the oxides.

Generally, the oxide temperature will be at least room temperature for example at least 20° C. and will preferably be at least 100° C.

It is thought that the copper oxide and/or manganese oxide catalyses the oxidation of TMVS in accordance with the following general equation:

$$(CH_3)_3SiCH=CH_2 + 9O_2 \rightarrow 5CO_2 + 6H_2O + SiO_2$$

although the invention does not depend on this particular reaction occurring.

Preferably both copper(II) oxide or manganese oxide are present in the process of the invention as an admixed mixture. Advantageously at least 10% of each oxide is present on a mole fraction basis, most advantageously at least 30% of each oxide is present again as a mole fraction basis, for example 50% of each or 60% manganese oxide/40% copper oxide.

A suitable copper oxide and manganese dioxide admixture can be prepared by adding copper(II) sulphate solution to a sample containing a fine suspension of carefully prepared manganese dioxide, mixed with sodium carbonate. An intimate mixture of manganese dioxide and basic copper carbonate results. Heating the precipitated carbonate mixture produces a truly admixed copper oxide and manganese oxide suitable for use in the invention.

A commercial catalyst comprising about 50% of copper oxide and 50% of manganese oxide, on a mole fraction basis, is available under the trade name "Moleculite" from Molecular Products Limited (UK).

It has been found that the use of a mixed copper oxide/manganese oxide catalyst is surprisingly beneficial in TMVS abatement when operated at the high temperatures required in the process of the invention.

It is preferable for all the Cupraselect which may not have been reacted in the semiconductor processing chamber and which is therefore present in the exhaust stream to be itself decomposed prior to the process of the invention. This can be accomplished by first completely cracking any unreacted Cupraselect on a heated surface at a temperature of 150° C. to 350° C. This action will liberate TMVS and bis-(1,1,1,5,5,5-hexafluoropentane-2,4,dionato)-copper, (or bis-hexafluoroacetylacetonato-copper(II)), the latter of which is commonly known as "Cu(II)(Hfac)"$_2$.

The positioning of apparatus for carrying out the invention within an exhaust line from, for example, a semiconductor processing chamber can be effected to suit the particular circumstances pertaining in the line/chamber.

In preferred embodiments, the unreacted Cupraselect from a semiconductor processing operation will deposit copper (metal) on the inner surfaces of the hot exhaust line or of hot valves and/hot pumps used therein. Preferred embodiments of the invention therefore position a hot cracker in the process exhaust line from the reaction chamber, and before (upstream of) the vacuum pump, to decompose all the "Cupraselect" before it can decompose in the pumping mechanism. The resulting by-products, including TMVS are thereafter pumped through the hot mechanism of the pump, before the $Cu(II)(Hfac)_2$ is condensed in an air cooled condenser and the TMVS is passed to the process of the invention for treatment. In such embodiments, apparatus for carrying out the process of the invention can advantageously be positioned downstream of the vacuum pump or pumps in particular.

In its simplest form, the process of the invention may be carried out by placing copper oxide and manganese oxide particles in a heated tube, for example stainless steel, at a temperature of at least room temperature (20° C.) and preferably above 100° C. and passing the TMVS containing exhaust stream and a source of oxygen through the tube.

The source of oxygen may be oxygen or oxygen-containing gas mixtures including air. The oxide mixture may be simply the oxide particles themselves or may be mixed with a suitable inert carrier material.

In preferred embodiments, the process may be carried out in conjunction with a dry scrubber, for example of the GRC reactor type described herein. In such embodiments, the oxide mixture may be admixed with the dry scrubber reagents. In the case of a GRC reactor in particular, the copper oxide/manganese oxide particle mixture can advantageously be added at the exhaust end of the calcium oxide (second) stage, ideally by admixing with the calcium oxide to a depth of, for example 100 mm.

BRIEF DESCRIPTION OF THE DRAWING

The FIGURE is a schematic diagram of a silicon/calcium oxide dry scrubber modified to operate in accordance with the invention.

DETAILED DESCRIPTION OF THE INVENTION

With reference to the drawing, there is shown a GRC reactor of the type described herein having an outer metal body 1 and an inner stainless steel tubular body 2 sandwiched between which is a heat insulating material 3.

Held within the inner body 2 are the materials which perform the scrubbing process, namely a first stage 4 comprising granules of silicon of a diameter of approximately 5 mm to 30 mm, and a second stage 5 comprising particles of lime (calcium oxide) of a diameter of approximately 3 mm to 6 mm.

Within the insulating material 3 are positioned about the inner body 2 a number of electrical resistance heating coils 6 spaced axially about the tube and designed to heat the first stage silicon particles to a temperature of about 500° C. and to heat the second stage lime particles to a temperature of about 575° C.

In normal operation of the GRC reactor shown in the drawing, an exhaust gas stream pumped from a semiconductor processing chamber by means of a vacuum pump system (not shown) is urged via a line 7 in to the bottom entry port 8 of the "GRC" reactor.

The stream then passes through the first stage 4 and second stage 5 of the reactor and leaves the reactor via the exit port 9 passes through line 10 and, finally, is exhausted at 11.

In passing through the reactor the various noxious species commonly present in semiconductor exhaust stream (and normally diluted in an inert carrier gas such as nitrogen) are abated by reaction in the first and second stages to render them non-toxic.

As stated above, however, this type of reactor tends to abate or scrub up to 85% or 90% of any TMVS present in the exhaust stream.

In accordance with the invention, there is provided a stage 12 of a mixture of copper oxide and manganese oxide which, in the embodiment shown in the drawing, forms a third reactor stage at the exhaust end of the react or body. The oxide mixture was prepared by adding copper(II) sulphate solution to a sample containing a fine suspension of carefully prepared manganese dioxide, mixed with sodium carbonate. An intimate mixture of manganese dioxide and basic copper carbonate results. After washing, caking and drying the resulting precipitate, the cake is heated at about 200° C. to produce the oxide admixture.

The third reactor stage is designed to be heated to about 550° C. by means of further heating coils 13. The depth of the third stage was about 100 mm in contrast to the overall length of the body 2 being about 1.5 m.

In addition, a supply of oxygen to the third stage 12 is afforded from a supply of air from a compressed air source (not shown) via the pipe 14 in to the very top portion of the second stage 5 such that, in use, the oxygen is carried into the third stage 12 by means of the general flow of exhaust gases through the reactor.

In use of the modified reactor of the invention as shown in the drawing, exhaust streams comprising various concentrations of TMVS in nitrogen ranging up to 10,000 ppm TMVS and a different flow rate over the range 10 to 110 l/min were introduced in to the modified reactor via the line 7 and with a steady flow of air in to the third reactor stage 12 via the line 14. A VG Quadruple mass spectrometer 15 was attached to the line 10 to analyse the amount of TMVS present in that line, i.e. exhausting from the reactor, utilising M/Z values 55, 70, 73, 85 and 100 which relates to $M^+100$ and $[M^+—(CH_3)_{3-n}]$ where n=1, 2, 3=85, 70, 55 and $(CH_3)_3Si^+=73$.

In addition, the level of water in the line 10 was measurable by means of a Draeger tube 16.

Determination of TMVS concentration in the tube 10 by means of the mass spectrometer 15 revealed a largest concentration of TMVS of 0.4±0.4 ppm of TMVS representing a huge decrease in TMVS concentrations in the exhaust streams and well within anticipated TLV levels. In particular, the usefulness of the admixed copper/manganese oxides at the unusually high temperatures of about 550° C. should be noted.

Determination of the levels of water in the tube 10 by means of the Draeger tube showed a corresponding increase in the water concentration reflecting the expected abatement reaction according to the equation quoted above.

While an embodiment of the present invention has been described in detail, it should be apparent that further modifications and adaptations of the invention will occur to those skilled in the art. It is to be expressly understood, however, that such modifications and adaptations are within the spirit and scope of the invention.

I claim:

1. A process for the abatement of trimethylvinylsilane (TMVS) by contacting a gas stream containing TMVS with copper(II) oxide (CuO) and/or manganese oxide ($MnO_2$) in the presence of sufficient oxygen to prevent reduction of the oxides wherein the oxide is at a temperature of at least room temperature.

2. The process according to claim 1 wherein the temperature of the oxide is at least 100° C.

3. The process according to claim 1 wherein both copper (II) oxide and manganese oxide are present as an admixed mixture.

4. The process according to claim 3 wherein at least 10% of each oxide is present on a mole fraction basis.

5. The process according to claim 3 wherein at least 30% of each oxide is present on a mole fraction basis.

* * * * *